US010661862B2

(12) United States Patent
Melis et al.

(10) Patent No.: US 10,661,862 B2
(45) Date of Patent: May 26, 2020

(54) FLOATING WIND TURBINE ASSEMBLY, AS WELL AS A METHOD FOR MOORING SUCH A FLOATING WIND TURBINE ASSEMBLY

(71) Applicant: SINGLE BUOY MOORINGS INC., Marly (CH)

(72) Inventors: Cecile Melis, Monaco (FR); Christian Raymond Bauduin, Monaco (FR); Francois Caille, Monaco (FR)

(73) Assignee: SINGLE BUOY MOORINGS INC., Marly (CH)

( * ) Notice: Subject to any disclaimer, the term of this patent is extended or adjusted under 35 U.S.C. 154(b) by 138 days.

(21) Appl. No.: 15/738,594

(22) PCT Filed: Jun. 27, 2016

(86) PCT No.: PCT/EP2016/064804
§ 371 (c)(1),
(2) Date: Dec. 21, 2017

(87) PCT Pub. No.: WO2016/207427
PCT Pub. Date: Dec. 29, 2016

(65) Prior Publication Data
US 2018/0170490 A1 Jun. 21, 2018

(30) Foreign Application Priority Data

Jun. 26, 2015 (EP) .................................... 15174077

(51) Int. Cl.
*F03D 13/25* (2016.01)
*B63B 35/44* (2006.01)
(Continued)

(52) U.S. Cl.
CPC ............ *B63B 35/44* (2013.01); *B63B 21/502* (2013.01); *F03D 13/20* (2016.05); *F03D 13/25* (2016.05);
(Continued)

(58) Field of Classification Search
CPC . B63B 35/44; B63B 21/502; B63B 2035/446; B63B 2021/505; F03D 13/20;
(Continued)

(56) References Cited

U.S. PATENT DOCUMENTS 4,906,139 A * 3/1990 Chiu ....................... B63B 9/065
114/265
7,156,586 B2 * 1/2007 Nim ....................... B63B 35/44
405/195.1
(Continued)

FOREIGN PATENT DOCUMENTS

CN 102 392 796 A 3/2012
EP 2 743 170 A1 6/2014
(Continued)

OTHER PUBLICATIONS

WO-2010029766-A1 Machine Translation. Accessed EPO website Jan. 7, 2020. 18 Pages. (Year: 2020).*
(Continued)

*Primary Examiner* — Richard A Edgar
(74) *Attorney, Agent, or Firm* — Young & Thompson

(57) ABSTRACT

Disclosed is a floating wind turbine assembly, including a floating platform and a wind turbine arranged on top of the floating platform, the wind turbine having a mast with a mast axis, of which a lower end is connected to the floating platform, and a nacelle arranged on top of the mast, wherein the floating platform is connected to a seafloor with a plurality of tensioned mooring lines, wherein the mooring lines each include a mooring line axis extending in a longitudinal direction of the mooring line, wherein the mooring line axes intersect each other at a crossing position on the mast axis and at an elevation level at or above the nacelle, as well as a method for mooring such a floating wind turbine assembly.

11 Claims, 4 Drawing Sheets

(51) Int. Cl.
*B63B 21/50* (2006.01)
*F03D 13/20* (2016.01)

(52) U.S. Cl.
CPC . *B63B 2035/446* (2013.01); *B63B 2035/4453* (2013.01); *F05B 2240/912* (2013.01); *F05B 2240/93* (2013.01); *F05B 2240/95* (2013.01); *Y02E 10/726* (2013.01); *Y02E 10/727* (2013.01); *Y02E 10/728* (2013.01)

(58) Field of Classification Search
CPC .................. F03D 13/25; F05B 2240/95; E02B 2017/0091; Y02E 10/727
USPC ............................................................ 415/7
See application file for complete search history.

(56) References Cited

U.S. PATENT DOCUMENTS

| 8,056,298 | B2 * | 11/2011 | Haugsoen | ............ E02B 17/027 52/651.09 |
| 8,692,401 | B2 | 4/2014 | Roddier et al. | |
| 2008/0240864 | A1 | 10/2008 | Belinsky | |
| 2012/0103244 | A1 | 5/2012 | Gong et al. | |
| 2012/0304911 | A1 | 12/2012 | Mccoy | |
| 2013/0276687 | A1 | 10/2013 | Roddier et al. | |

FOREIGN PATENT DOCUMENTS

| KR | 101 488 292 B1 | 1/2015 | |
| WO | 2009/064737 A1 | 5/2009 | |
| WO | 2009/131826 A2 | 10/2009 | |
| WO | WO-2010029766 A1 * | 3/2010 | ........... B63B 21/502 |
| WO | 2013/084632 A1 | 6/2013 | |
| WO | WO-2014073956 A1 * | 5/2014 | ............ B63B 21/50 |
| WO | 2014/140653 A1 | 9/2014 | |
| WO | 2015/048147 A1 | 4/2015 | |

OTHER PUBLICATIONS

International Search Report, dated Aug. 29, 2016, from corresponding PCT/EP2016/064804 application.

* cited by examiner

FLOATING WIND TURBINE ASSEMBLY, AS WELL AS A METHOD FOR MOORING SUCH A FLOATING WIND TURBINE ASSEMBLY

FIELD OF THE INVENTION

The invention relates to a floating wind turbine assembly, comprising a floating platform and a wind turbine arranged on top of the floating platform, the wind turbine having a mast with a mast axis, of which a lower end is connected to the floating platform, and a nacelle arranged on top of the mast, wherein the floating platform is connected to the seabed with a plurality of tensioned mooring lines, wherein the mooring lines each comprise a mooring line axis extending in a longitudinal direction of the mooring line. The invention also relates to a method for mooring such a floating wind turbine assembly.

BACKGROUND OF THE INVENTION

Such floating wind turbine assemblies are known from, for instance, WO 2015/048147 A1, WO 2009/064737 A1, KR 101488292, WO 2014/140653 A1, EP 2743170 A1, WO 2013/084632 A1, CN 102392796 A, US 2012/103244 A1, WO 2009/131826 A2 or US 2008/240864 A1.

In general, there are four categories of floater types to support floating wind turbines, each inspired by existing oil and gas concepts:
1. Semi-type
2. Spar/deep draft type
3. Barge type
4. Tension Leg Platform (TLP)

The types which can operate only in limited water depth, like articulated towers, are not listed above.

The main challenge of supporting a wind turbine, however, differs from supporting equipment topside, such as the case with drilling or mooring equipment. First of all, the device being supported, i.e. the turbine is slender and carries a significant mass at a large elevation above the floater keel, elevating the center of gravity of the whole object. This tends to make the floater unstable.

In operational conditions (when the turbine is producing power), a large thrust force is exerted at the nacelle elevation, i.e. high above the sea level. This will tend to give a significant overturning moment at the turbine connection to the floater.

All the concepts which have been patented so far are trying to limit the pitch/roll which is induced by this overturning moment, as it is the most demanding constraint imposed by turbine manufacturers.

The restoring in pitch/roll of a floater is proportional to its metacentric height, GM, which is the distance between the center of gravity G and its metacenter M. The higher the GM, the more stable the floater is.

For category 1, the semi-type, stability is achieved by elevating the metacenter M by putting water plane area far from the center of rotation. This will give in turn restoring on the pitch/roll degrees of freedom.

For category 2, spar or deep draft type, stability is achieved by lowering the center of gravity G. These structures also tend to lower the level of loading induced by waves by presenting small volumes close to the water surface.

For category 3, barge type, which are relatively large structures giving them large water plane area.

For category 4, TLP, there is a clear advantage in terms of motion performance and stability, as both heave, pitch and roll degrees of freedom are restrained. Stability in heave is obtained through putting a large buoyancy below the water surface and counteracting it with large tensions in the mooring system. For rotational stability, overturning moment is balanced by a difference in tensions in the legs. This may hold for a TLP with three groups of legs, but the same reasoning is valid with four or even more groups of legs.

An object of the present invention is to provide a floating wind turbine assembly, in particular of the TLP type, having improved stability, in particular when a large thrust force is exerted at the nacelle elevation.

SUMMARY OF THE INVENTION

Hereto, according to the invention, each mooring line (8) comprises an incremental tensioning system acting on the mooring lines in such a way that the buoyancy tanks (13) are submerged.

By gradually tensioning of the mooring legs, the radial buoyancy tanks are submerged and the hydrostatic stability conferred by the buoyancy tanks piercing the water surface, is progressively transferred to the mooring legs.

This stability of the floating structure, prior to its fixation to the sea bed, is conferred primarily by the radial tanks. As for a cataraman type hull, the fact that the buoyancy tanks pierce the sea surface over a waterplane area, S, at a distance, d, from the axis of rotation, induces a resistance to rotation that is proportional to $Sxd^2$. The larger the span of the radial buoyancy tanks, the larger will be the resistance to overturning. To a lesser extent, the truss structure and/or the central tank, if they pierce the sea surface, also contribute to the stability in the towing configuration. This stability is usually termed as hydrostatics stability, as opposed to mooring stability, conferred by the tensioned mooring lines when the floater is in an operational configuration.

In an embodiment, the mooring line axes intersect each other at a crossing position on the mast axis and at an elevation level at or above the nacelle.

The invention is a novel way of mooring a TLP type floater supporting a wind turbine. The mooring lines, which can be made indifferently of tendons, chain, wire or synthetic rope, are attached at an angle instead of being vertical.

The invention proposed here is inspired by the TLP concept but addresses the specific loading exerted by a wind turbine and the specific constraint of motion performance at the nacelle. Instead of mooring the floater by vertical legs, the legs are arranged at an angle with respect to the vertical, so that their crossing point on the mast axis occurs at an elevation level at or above the nacelle.

The novelty of the invention is the way the legs are arranged with respect to the structure. Compared to a classical vertical-leg TLP, it enables to tune the position of a fixed point around which the whole object rotates. At this point, the surge and sway are restrained while the roll and pitch are compliant, making it different from the conventional behaviour of a TLP. Also, this enables to respond optimally to the specific loading and constraints imposed by a wind turbine.

Although the roll and pitch degrees of freedom (DOF) are compliant, rotation occurs around the crossing points of the mooring legs. Unlike conventional TLPs, in this invention the crossing point is located close to or above the nacelle. This ensures that the actual roll/pitch-induced translational motion seen by the nacelle and the blades is small compared to other systems with compliant roll/pitch DOF and to conventional TLP's for which surge/sway motions are unrestrained. This enhances the aerodynamic performance of the wind turbine and reduces the need for complex control due to the relative wind velocity induced by the floater motions.

This also enhances the accessibility of the nacelle for maintenance operations. Even in normal operating sea states, the possibility to land with an helicopter on a platform located at the nacelle level should be enabled by the low motion behavior of the floater and its mooring system.

Another embodiment relates to an aforementioned floating wind turbine assembly, wherein the floating platform has a substantially horizontal truss structure having an upper level and a lower level, at least three coplanar buoyancy tanks, a central structure at a central position and three radial tanks substantially equidistant from the central structure, the truss structure connecting the buoyancy tanks at the lower level and the lower end of the mast being connected to the floating platform at the upper level, above the central structure. This leads to a particularly stable floating configuration in particular when the floating platform is towed to site with the wind turbine already integrated. The central structure may comprise a central (buoyancy) tank, if desired. Another embodiment relates to an aforementioned floating wind turbine assembly, wherein the mooring lines comprise at least three mooring lines.

Another embodiment relates to an aforementioned floating wind turbine assembly, wherein the at least three mooring lines have lower and upper ends linking the floating platform to the seafloor using connecting means provided to receive the upper ends of the three mooring lines each at positions on the truss structure at the lower level corresponding to the radial tanks.

Another embodiment relates to an aforementioned floating wind turbine, wherein the mooring lines are tensioned by a tensioning system such as to keep the floating platform lower than the water level with only the upper level of the truss structure extending above the water level. This tensioning system allows for precise adaptation of the operational draft and thus precise tuning of the floating characteristics of the floating wind turbine assembly.

Another embodiment relates to an aforementioned floating wind turbine assembly, wherein the tensioning system comprises removable tensioning means provided on the truss structure at the upper level.

Another embodiment relates to an aforementioned floating wind turbine assembly, wherein the floating structure comprises a tensioning line, extending along the truss structure between the connecting means and the tensioning means, connectable to the mooring lines and the tensioning means. Another embodiment relates to an aforementioned floating wind turbine assembly, wherein the mooring line extends from the seafloor to the lower radial tank and then deviated along the truss structure so that the connecting means may be located above water level and close to the tensioning means.

Another aspect of the invention relates to a method for mooring an aforementioned floating wind turbine assembly, comprising the steps of:
   quayside assembly (or dockside assembly) of the floating platform and the wind turbine to form a floating wind turbine assembly,
   anchoring lower ends of the plurality of mooring lines to the seafloor at the desired seafloor connecting positions,
   towing the floating wind turbine assembly to a desired wind turbine location above the seafloor connecting positions and the mooring lines anchored there,
   connecting upper ends of the mooring lines to connecting means on the floating platform, in such a way, that the mooring line axes intersect each other at a crossing position on the mast axis and at an elevation level at or above the nacelle.

Another embodiment relates to an aforementioned method, wherein, when a tensioning system is present, each of the plurality of mooring lines is tensioned using the tensioning system, such that the floating platform is lowered to a submerged position. Throughout the initial phase of this lowering process, the radial tanks and/or central tank as well as the truss structure are being submerged into the water, resulting in an increase of the tensions in the mooring lines. Once the radial tanks have disappeared below the sea surface, they do not ensure anymore the stability of the floater and turbine assembly through hydrostatic restoring. However, this stabilizing function has been gradually transferred to the mooring system. This method is novel in the way that is does not require any external means (temporary buoyancy, tugs pulling mainly horizontally onto the floater) to maintain stability throughout the whole submergence process. However, external means can also be used to complement the stability during the submergence process.

This particular installation method enables to keep stable all along the tensioning process, allowing a smooth transition between hydro-elastic stiffness conferred by the radial tanks to elastic stiffness conferred by the mooring lines.

BRIEF DESCRIPTION OF THE DRAWINGS

Embodiments of a floating wind turbine assembly according to the invention will by way of non-limiting example be described in detail with reference to the accompanying drawings. In the drawings.

DETAILED DESCRIPTION OF THE INVENTION

Figure 1:
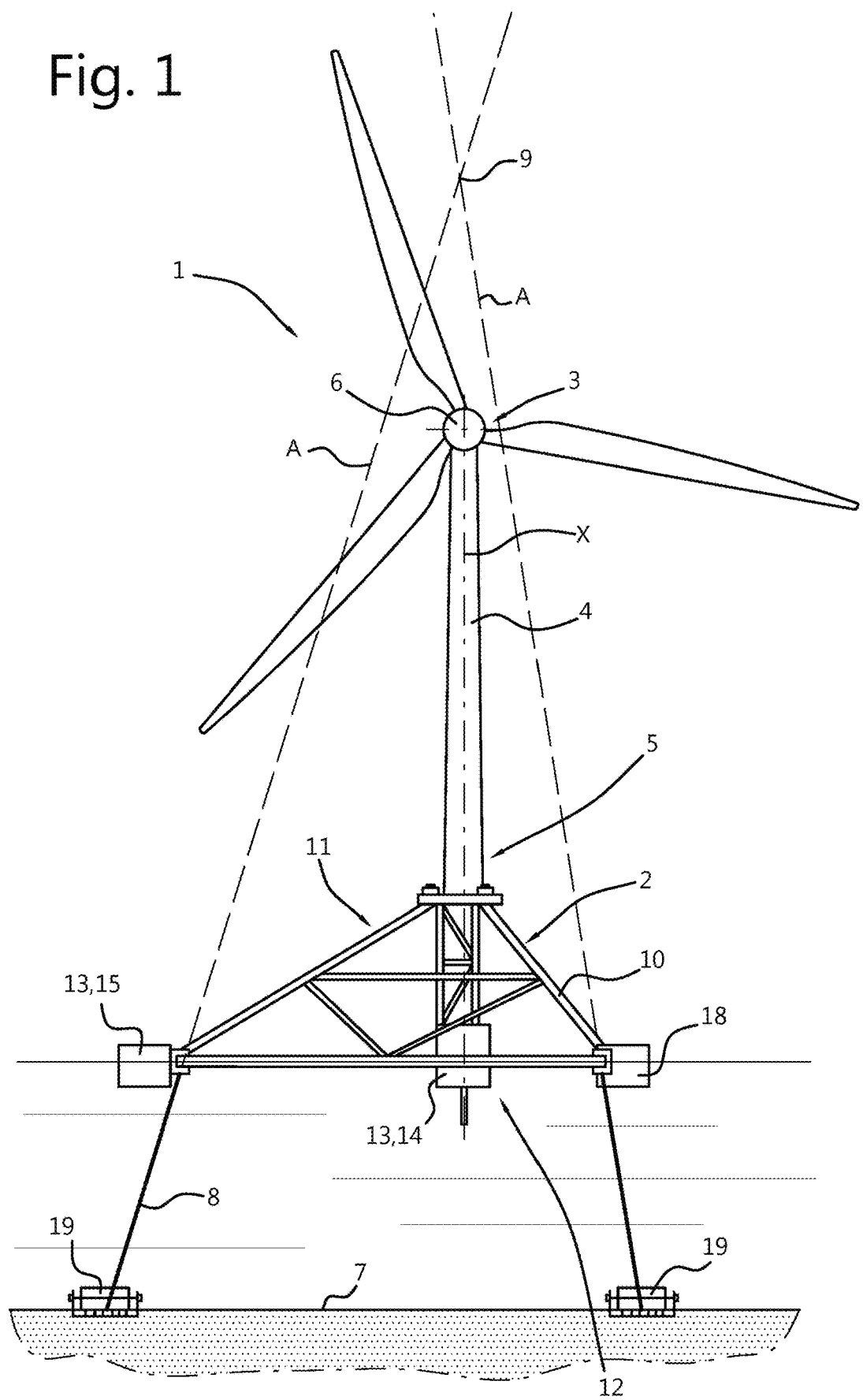
FIG. 1 shows a schematic side view of an exemplary embodiment of a floating wind turbine according to the invention.
Figure 2:
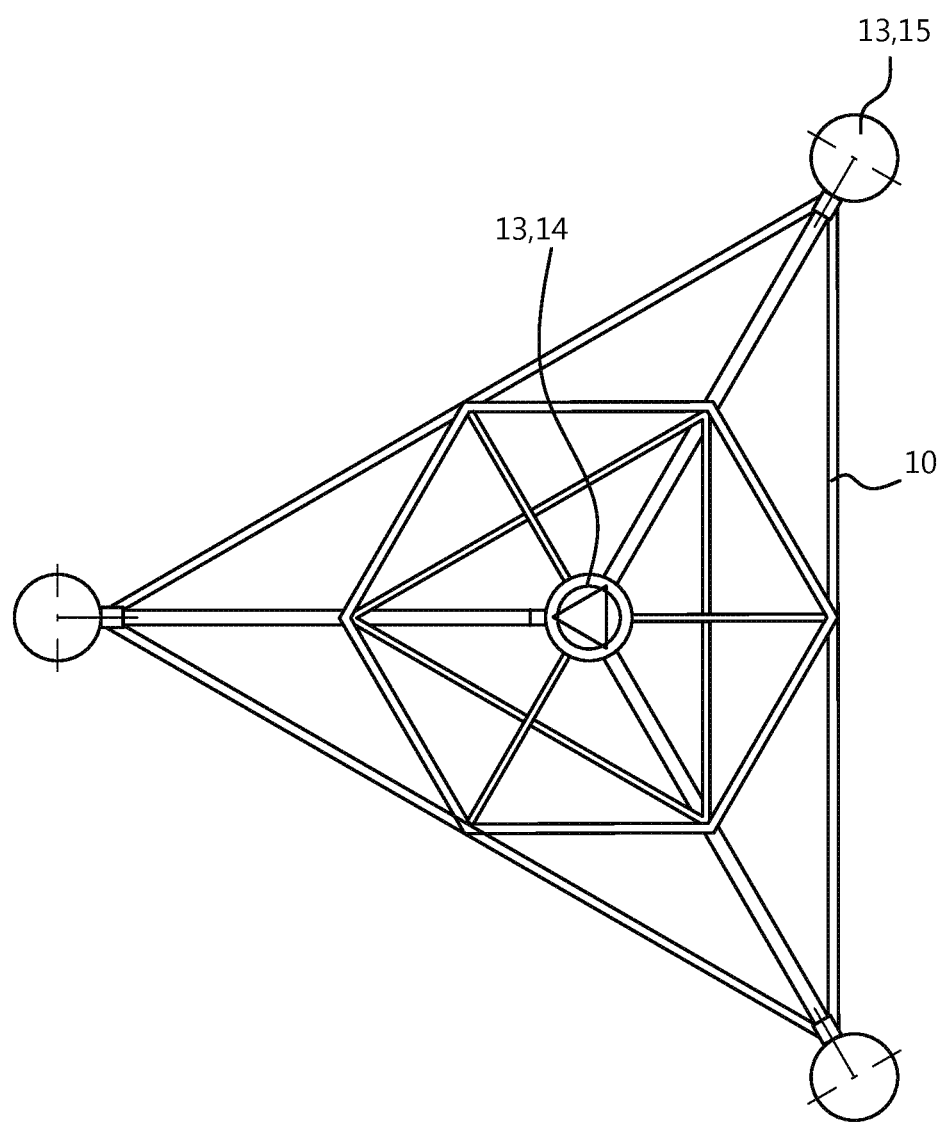
FIG. 2 shows a top view of the floating platform of the floating wind turbine assembly shown in FIG. 1.

FIGS. 1 and 2 will be discussed in conjunction. FIG. 1 shows a floating wind turbine assembly 1, comprising a floating platform 2 and a wind turbine 3 arranged on top of the floating platform 2. The wind turbine 3 has a mast 4 with a mast axis X, of which a lower end 5 is connected to the floating platform 2. A nacelle 6 is arranged on top of the mast 4, for instance at an elevation of 60-80 m, such as around 70 m. The floating platform 2 is connected to a seafloor 7 with a plurality of tensioned mooring lines 8. The mooring lines 8, such as tension or mooring legs as shown, each comprise a mooring line axis A extending in a longitudinal direction of the mooring line 8. According to the invention, the mooring line axes A intersect each other at a crossing position 9 on the mast axis X and at an elevation level at or above the nacelle 6.

The floating platform 2 has a substantially horizontal truss structure 10 having an upper level 11 and a lower level 12. Four buoyancy tanks 13 are provided, A central structure 14 comprises a central tank 14 at a central position and three coplanar radial tanks 15 are situated substantially equidistant from the central tank 14. The truss structure 10 connects the buoyancy tanks 13 at the lower level 11 and the lower end 5 of the mast 4 is connected to the floating platform 2 at the upper level 12, above the central tank 14. Preferably, the mooring lines 8 comprise at least three mooring lines. The at least three mooring lines 8 have lower 16 and upper 17 ends linking the floating platform 2 to the seafloor 7 using connecting means 18 provided to receive the upper ends 17 of the three mooring lines 8 each at positions on the truss structure 10 at the lower level 12 corresponding to the radial tanks 15. The mooring lines 8 are tensioned by a tensioning system (not shown) such as to keep the floating platform 2 lower than the water level with only the upper level 11 of the truss structure 10 extending above the water level. The tensioning system comprises removable tensioning means (not shown) provided on the truss structure at the upper level. The floating structure 1 may comprise a tensioning line (not shown), extending along the truss structure 10 between the connecting means 18 and the tensioning means, connectable to the mooring lines 8 and the tensioning means. The mooring lines 8 may extend at an angle of for instance 5-30°, such as 10-20° with respect to the vertical. It is conceivable that each individual mooring line 8 extends at an angle with respect to the vertical being different from the extension angle of the other mooring lines 8. This depends on local weather/sea conditions, the structure of the floating platform 2, et cetera.

The incremental tensioning system has not been indicated in detail but may comprise a chain locker interacting with a top chain part of the mooring lines 8, may comprise a winch acting on each mooring line, or may comprise a tensioning system utilising hydraulic jacks. Suitable tensioning systems are described in WO2013124717, EP 2 729 353, EP 0 831 022, EP 1 106 779 or U.S. Pat. No. 9,139,260.

Mooring the aforementioned floating wind turbine assembly 1 may comprise the steps of:
  quayside assembly of the floating platform 1 and the wind turbine 3 to form a floating wind turbine assembly 1,
  anchoring lower ends 16 of the plurality of mooring lines 8 to the seafloor 7 at the desired seafloor connecting positions 19,
  towing the floating wind turbine assembly 1 to a desired wind turbine location above the seafloor connecting positions 19 and the mooring lines 8 anchored there,
  connecting upper ends 17 of the mooring lines 8 to connecting means 18 on the floating platform 2, in such a way, that the mooring line 8 axes A intersect each other at a crossing position 9 on the mast axis and at an elevation level at or above the nacelle 6.

Preferably, each of the plurality of mooring lines 8 is tensioned using an incremental tensioning system, such that the floating platform 2 is lowered to a submerged position without recurring to external means to ensure its stability throughout the tensioning process. Stability is first ensured by hydrostatics when the radial tanks 15 pierce the sea surface. Then, along the mooring lines pulling process, stability is progressively transferred to the mooring lines 8, of which tensions are gradually augmented thanks to increasing the submergence of the radial tanks 15, the central tank 14 and the truss structure 10.

When thrust is exerted at the nacelle level, a change in the legs 8 tension will also occur as a reaction. But because the resultants all cross at the point where the thrust is applied, this point is not moving. Therefore, the surge and sway motion at the nacelle 6 is also restrained. When wave loading occurs on the floating platform 2, it will surge to create reaction from the anchor/mooring legs 8, but the nacelle 6 will remain almost fixed. The mooring legs 8 can also be inclined but without crossing exactly at the nacelle 6 elevation. Then the fixed point is created at the crossing point 9. The optimal crossing point needs to be determined based on the site-specific meteorological and/or ocean conditions, that will determine the wave loading on the floating platform 2 and the wind loading on the wind turbine 3, and the design constraints of the wind turbine 3. According to the invention, the crossing point 9 may be located at or above the nacelle 6 location to ensure a stable behaviour in extreme conditions.

Figure 3A:
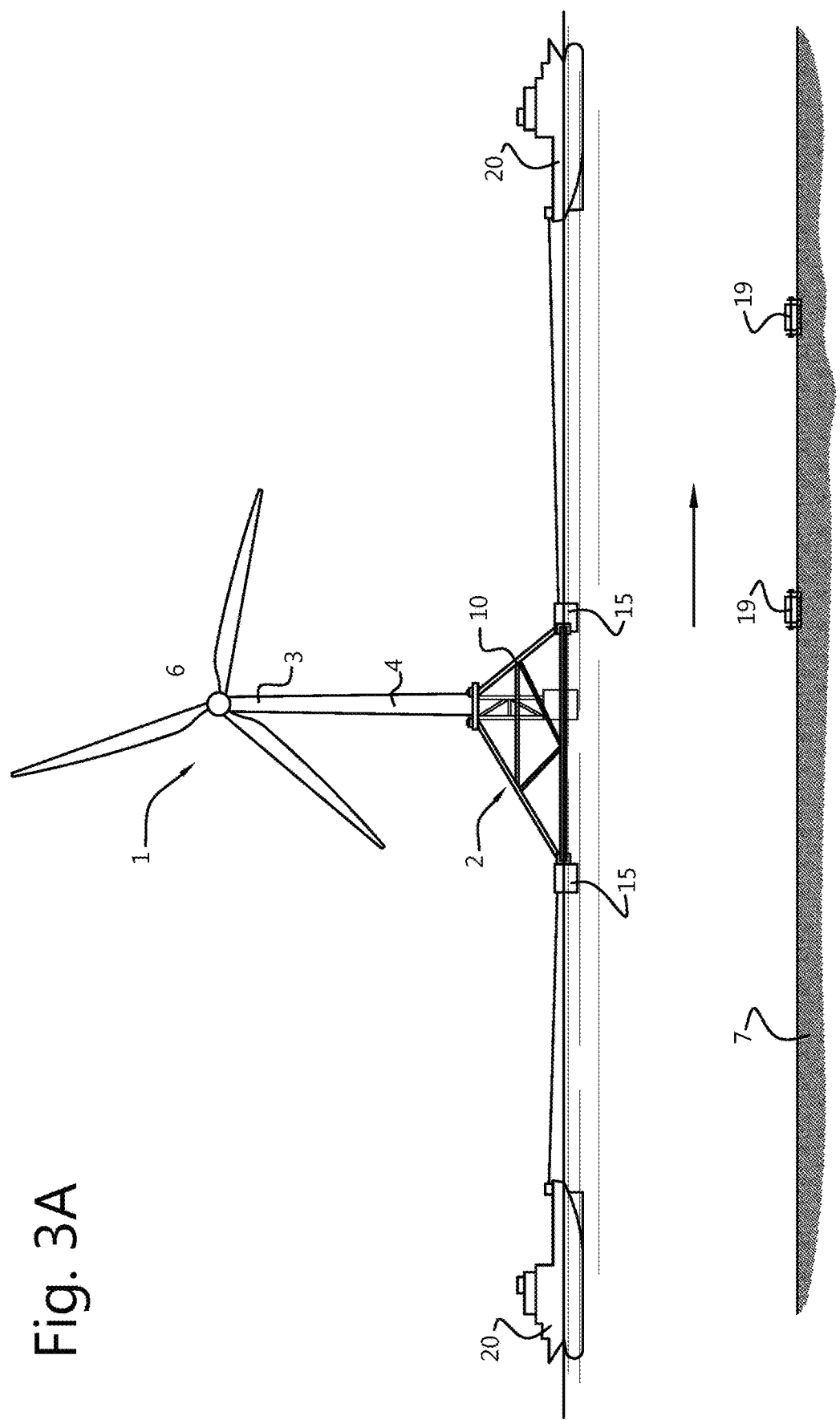
FIG. 3a shows a side view of the floating platform being towed to the desired wind turbine location by towing boats.
Figure 3B:
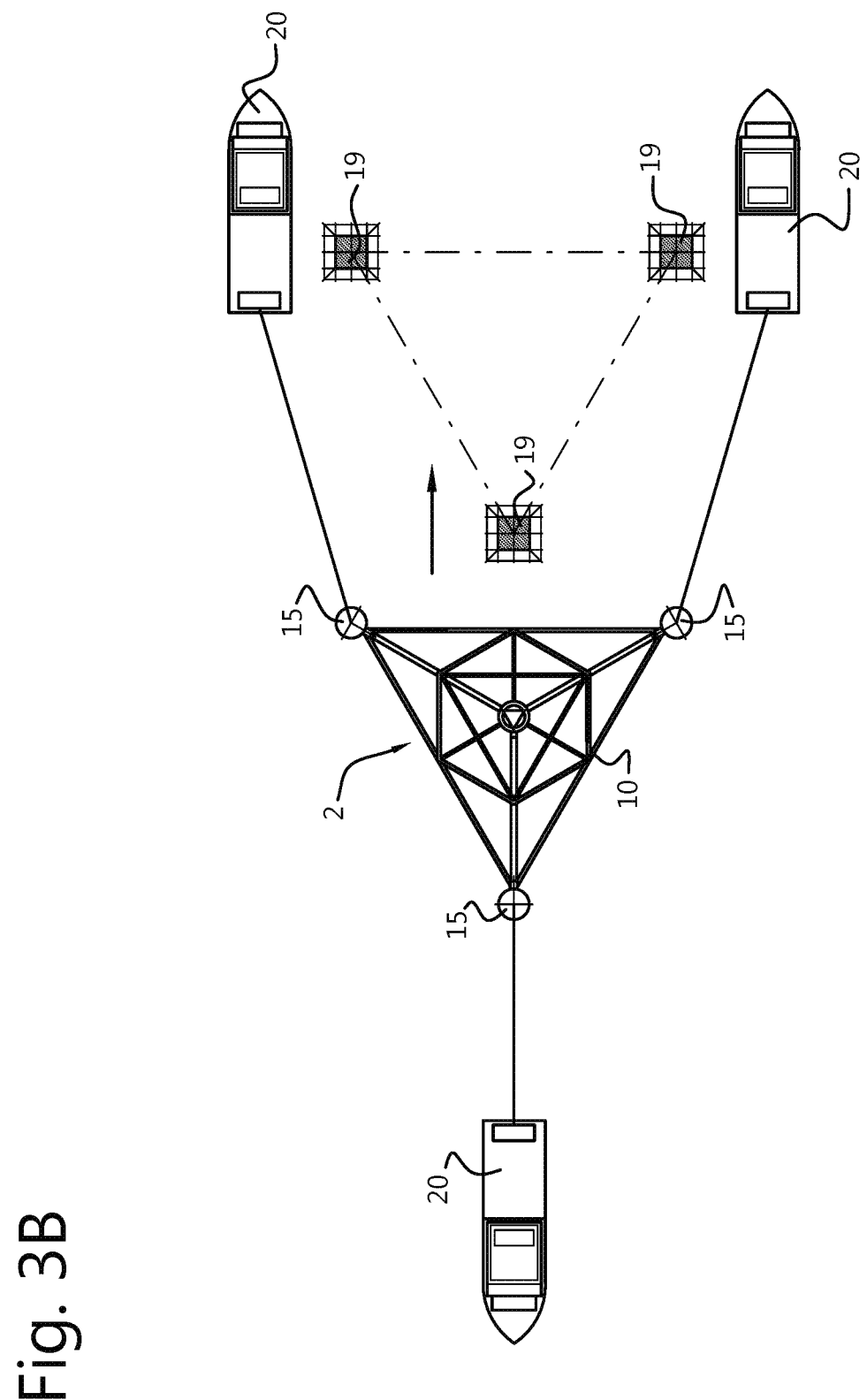
FIG. 3b shows a top view of the floating platform being towed to the desired wind turbine location by towing boats.

Unlike conventional TLP's, a large span allows the floating platform 2 to be naturally stable in particular in towing and free-floating conditions. Therefore, the wind turbine 3 can be assembled at quayside and the entire floating wind turbine assembly 1 can be towed to site. FIGS. 3a and 3b actually show the floating platform 2 being towed to the wind turbine location by towing boats 20. Each towing boat 20 is connected with a towing line to a corner of the truss structure 10, with two towing boats 20 pulling the floating platform 2 towards the wind turbine location and another towing boat 20 providing a counterforce.

Thus, the invention has been described by reference to the embodiments discussed above. It will be recognized that the embodiments are susceptible to various modifications and alternative forms well known to those of skill in the art without departing from the spirit and scope of the invention. Accordingly, although specific embodiments have been described, these are examples only and are not limiting upon the scope of the invention.

The invention claimed is:

1. A floating wind turbine assembly, comprising a floating platform with at least three buoyancy tanks and a wind turbine arranged on top of the floating platform, the wind turbine having a mast with a mast axis, of which a lower end is connected to the floating platform, and a nacelle arranged on top of the mast, wherein the floating platform is connected to a seafloor with a plurality of tensioned mooring lines, wherein the mooring lines each comprise a mooring line axis extending in a longitudinal direction of the mooring line,
  wherein the floating platform further comprises:
    a central structure at a central position relative to the at least three buoyancy tanks, wherein the at least three buoyancy tanks are substantially equidistant from the central structure, and
    a substantially horizontal truss structure having an upper level and a lower level, the truss structure connecting the at least three buoyancy tanks at the lower level and the lower end of the mast being connected to the floating platform at the upper level, above the central structure,
  wherein the buoyancy tanks are adapted for providing a hydrostatic stability when the floating wind turbine assembly is in a towing configuration in which the buoyancy tanks pierce the sea surface, and wherein for each mooring line an incremental tensioning system is provided which is adapted for gradually tensioning the mooring lines in such a way that the buoyancy tanks are submerged from a position in which they pierce the sea surface and provide the hydrostatic stability, to a position below the sea surface, during which submerging the hydrostatic stability conferred by the buoyancy tanks is progressively transferred to the mooring lines, so that, when in an operational configuration, the tensioned mooring lines confer a mooring stability.

2. The floating wind turbine assembly according to claim 1, wherein the mooring line axes intersect each other at a crossing position on the mast axis and at an elevation level at or above the nacelle.

3. The floating wind turbine assembly according to claim 2, wherein the mooring lines are tensioned by the incremental tensioning system in such a way that the floating platform is kept lower than the water level with only the upper level of the truss structure extending above the water level.

4. The floating wind turbine assembly according to claim 1, wherein the mooring lines comprise at least three mooring lines.

5. The floating wind turbine assembly according to claim 1, wherein the central structure comprises a central buoyancy tank.

6. The floating wind turbine assembly according to claim 1, wherein, the incremental tensioning system is further adapted for, when in the operational configuration, keeping the floating platform lower than the water level with only the upper level of the truss structure extending above the water level.

7. A floating wind turbine assembly, comprising a floating platform and a wind turbine arranged on top of the floating platform, the wind turbine having a mast with a mast axis, of which a lower end is connected to the floating platform, and a nacelle arranged on top of the mast, wherein the floating platform is connected to a seafloor with a plurality of tensioned mooring lines, wherein the mooring lines each comprise a mooring line axis extending in a longitudinal direction of the mooring line, wherein the mooring line axes intersect each other at a crossing position on the mast axis and at an elevation level at or above the nacelle,
wherein the floating platform further comprises:
at least three buoyancy tanks,
a central structure at a central position relative to the at least three buoyancy tanks, wherein the at least three buoyancy tanks are substantially equidistant from the central structure,
a substantially horizontal truss structure having an upper level and a lower level, the truss structure connecting the buoyancy tanks at the lower level and the lower end of the mast being connected to the floating platform at the upper level, above the central structure,
wherein the buoyancy tanks are adapted for providing a hydrostatic stability when the floating wind turbine assembly is in a towing configuration in which the buoyancy tanks pierce the sea surface, and wherein for each mooring line an incremental tensioning system is provided which is adapted for gradually tensioning the mooring lines in such a way that the buoyancy tanks are submerged from a position in which they pierce the sea surface and provide the hydrostatic stability, to a position below the sea surface, during which submerging the hydrostatic stability conferred by the buoyancy tanks is progressively transferred to the mooring lines, so that, when in an operational configuration, the tensioned mooring lines confer a mooring stability.

8. The floating wind turbine assembly according to claim 7, wherein the mooring lines comprise at least three mooring lines.

9. The floating wind turbine assembly according to claim 7, wherein, the incremental tensioning system is further adapted for, when in the operational configuration, keeping the floating platform lower than the water level with only the upper level of the truss structure extending above the water level.

10. A method for mooring a floating wind turbine assembly comprising the steps of:
providing a floating platform with a substantially horizontal truss structure, at least three coplanar buoyancy tanks, a central structure at a central position relative to the three buoyancy tanks, the truss structure connecting the buoyancy tanks,
assembling the floating platform and the wind turbine to form a floating wind turbine assembly that can be towed with the buoyancy tanks piercing the water surface,
anchoring lower ends of the plurality of mooring lines to the seafloor at the desired seafloor connecting positions,
towing the floating wind turbine assembly to a desired wind turbine location above the seafloor connecting positions and the mooring lines anchored there,
connecting upper ends of the mooring lines to the floating platform, and
tensioning each of the plurality of mooring lines using an incremental tensioning system, such that the floating platform is lowered and the buoyancy tanks are placed in a submerged position below the sea surface.

11. The method according to claim 10, wherein the mooring line axes intersect each other at a crossing position on the mast axis and at an elevation level at or above the nacelle.

* * * * *